United States Patent [19]
Shimomura

[11] Patent Number: 6,098,258
[45] Date of Patent: Aug. 8, 2000

[54] COMBINED MACHINING APPARATUS AND MACHINING METHOD BY USING THE SAME

[75] Inventor: Masumi Shimomura, Ishikawa, Japan

[73] Assignee: Komatsu Machinery Corp., Komatsu, Japan

[21] Appl. No.: 09/170,193

[22] Filed: Oct. 13, 1998

[30] Foreign Application Priority Data

Oct. 15, 1997 [JP] Japan ..................................... 9-281608
Mar. 16, 1998 [JP] Japan ................................... 10-065125

[51] Int. Cl.$^7$ ...................................................... B23B 7/00
[52] U.S. Cl. ............................. 29/27 C; 409/199; 82/106
[58] Field of Search ............................. 29/27 C; 82/106, 82/131, 1.11; 409/199, 132, 244, 276, 282

[56] References Cited

U.S. PATENT DOCUMENTS

| 2,008,793 | 3/1994 | Yakoviev . | |
| 4,054,975 | 10/1977 | Lundstrom | 29/27 C |
| 5,885,199 | 3/1999 | Shao | 483/19 |
| 5,947,805 | 9/1999 | Van Osenbruggen | 451/358 |

FOREIGN PATENT DOCUMENTS

| 5-65287 | 9/1993 | Japan . |
| 6-55333 | 3/1994 | Japan . |
| 2009793 | 3/1994 | Russian Federation . |

Primary Examiner—S. Thomas Hughes
Assistant Examiner—John C. Hong
Attorney, Agent, or Firm—Armstrong, Westerman, Hattori, McLeland & Naugthon

[57] ABSTRACT

A combined machining apparatus for turning (lathing) and broaching a workpiece is disclosed which includes a work head (4) for carrying a workpiece (12) to be machined while in rotation as clamped thereon, and one or more broaching unit (2) disposed proximal to the work head (4) and moved by a broaching unit feeder (6) longitudinally of the workpiece (12). A broach head (2c), mounted on the broaching unit (2), is moved towards and away from the workpiece (12) by a broach head feeder (7). Mounted on the broach head (2c) in the apparatus (1) is a broaching tool (10) which carries rough machining tips (10e) and finish machining tips (10f) removably on an outer peripheral surface of the broaching tool (10) for turning or lathing and broaching the workpiece (12). A broach drive (8) is operable under an NC to rotate the broaching tool (10). The apparatus (1) is further provided with a broach holding device (11) received in the broach head (2c) and designed to hold the broaching tool (10) fixed against rotation when the workpiece (12) is turned or lathed therewith and to permit the broaching tool (10) to be rotated and to hold it rotated with the broach drive (8) when the workpiece (12) is broached therewith. A method of machining, by turning or lathing and broaching, a workpiece (12), by using a combined machining apparatus as described is also disclosed.

4 Claims, 10 Drawing Sheets

COMBINED MACHINING APPARATUS AND MACHINING METHOD BY USING THE SAME

TECHNICAL FIELD

The present invention relates generally to a machine tool and more particularly to a combined machining apparatus or machine tool with the ability to perform turning (or lathing) and broaching operations, and a method of combined-machining a workpiece by using such an apparatus.

BACKGROUND ART

A broaching apparatus for carrying out a broaching operation has hitherto been known as described in Japanese Examined Patent Publication No. Hei 5-65287 and Japanese Unexamined Patent Publication No. Hei 6-55333.

A "circular broaching machine" described as in the former publication above employs a disk shaped tool or a broaching cutter having on its periphery a rough machining edge and a finish machining edge and adapted to be rotated relatively slowly to cut or to turn (or lathe) a rotating workpiece. With the ability to broach a workpiece on a lath, such a machine tool has an advantage of yielding a machined product that is better in quality than with a lathe or a planing machine or miller.

On the other hand, an "apparatus for the fixation of a broaching cutter" as described in the latter publication above is designed to ease an exchange of broaching tools in a broaching machine and is provided with a fit section for accepting a broaching tool and a clamp means for fixing a broach shaft to the drive shaft, on the side of a drive shaft, and a center for supporting the broach shaft rotatably, on the side of a support shaft. There, the drive shaft is adapted to be driven into rotation, by a motor for rotating the broaching cutter, via a reduction gear that couples the motor to the drive shaft.

A broaching machine as described in either of both these publications, in which a broaching tool is rotated to machine a workpiece and hence a large cutting torque acting on a drive system in machining is inherent and then requires the drive system with a reduction ratio large enough to withstand the large cutting torque. However, drive systems with a larger reduction ratio inconveniently makes the equipment larger in size and more costly.

On the other hand, the broaching tool in a finish machining operation develops less cutting torque acting on a drive system and may then have the drive system less in reduction ratio to bear the cutting torque. Also, used in a turning operation a tool to be indexed is desirably rotated rapidly in order to shorten the time of indexing and then makes the use of a drive system of less reduction ratio desirable in order to enhance the efficiency of operation.

With a conventional broaching machine as described in either of the publications mentioned above, however, there inconveniently ensues only a poor operating efficiency because of a prolonged time of indexing that inherently entails.

SUMMARY OF THE INVENTION

It is accordingly an object, among others, of the present invention to overcome these disadvantages met in the prior art.

In order to attain these objects, there are provided in accordance with the present invention, a combined machining apparatus and a method of machining a workpiece by using the same.

A combined machining apparatus hereby provided in a first aspect and a certain form of practical embodiment thereof is adapted to machine, both by turning (lathing) and broaching, a workpiece and comprises:

a work head for carrying a workpiece to be machined while in rotation, whereby the workpiece at least at one end thereof is clamped;
 at least one broaching unit disposed in the vicinity of the said work head;
 a unit feed means for displacing the said at least one broaching unit in a longitudinal direction of the workpiece;
 a broach head mounted on the said broaching unit;
 a broach head feed means for displacing the said broach head towards and away from the workpiece;
 a broaching tool mounted on the said broach head and adapted to carry rough machining tips and finish machining tips detachably on an outer peripheral surface of the said broaching tool for both turning (lathing) and broaching the workpiece;
 a broach drive means operable under an NC for rotating the said broaching tool; and
 a broach holding means received in the said broach head and adapted to hold the said broaching tool fixed against rotation when said workpiece is turned (lathed) therewith and to permit the said broaching tool to be rotated with the said broach drive means when said workpiece is broached therewith.

The construction described in which when a workpiece is rough machined by turning or lathing, the broaching tool is held fixed against rotation with a broach holding means, permits the broach holding means actuated to effectively bear any large cutting torque and thereby effectively prevents that torque from being directly applied to the broach drive means.

This allows the broach drive means to be designed to be with a reduced speed reduction ratio and thus permits an indexing operation for rough machining tips to be carried out quickly and at an enhanced efficiency for preparing a turning or lathing process. In a subsequent broaching process to be performed to finish machine the rough machined workpiece by the broaching tool allowed to freely rotate with the broach holding means deactuated, only a small cutting torque develops and permits the broach drive means only with the reduced speed reduction ratio to sufficiently withstand the cutting torque.

What results is also permitting the use of a broach drive means with a reduced size and capacity, which renders its assembled device inexpensive even with numerically controlled servo motors employed and their cost taken into account, and permits the entire equipment for the apparatus to be smaller in size and to be readily installed in a limited space.

In the construction described, it is preferred that the said broach holding means comprise a tooth coupling of three toothed element type that is received in a broach shaft adapted to carry the said broaching tool, and a fluid pressure cylinder for actuating and deactuating the said tooth coupling.

Such specific construction serves to intensify the strength of the broach holding means bearing a cutting torque that acts thereon during the rough machining of a workpiece and thus to alleviate vibrations and a noise being generated in the cutting zone, permitting the life of a tool to be increased, the operating environments to be improved and the cutting accuracy also to be enhanced.

Alternatively, the said broach holding means preferably comprises a disk fastened to a broach shaft adapted to carry the said broaching tool and a hydraulic clamper adapted to clamp and unclamp the said disk.

Such alternative specific construction also serves to intensify the strength of the broach holding means bearing a cutting torque that acts thereon during the rough machining of a workpiece and thus here again to alleviate vibrations and a noise being generated in the cutting zone, permitting the life of a tool to be increased, the operating environments to be improved and the cutting accuracy also to be enhanced.

Besides, free from any action to bring toothed elements into and out of engagement with one another as in the tooth coupling embodiment, this alternative construction permits the broaching tools to be fixed and released quickly.

In this specific embodiment, it is preferred that the said hydraulic clamper comprise a plurality of cylinders positioned opposite to one another across the said disk and pistons received in the said cylinders and adapted to clamp the said disk from opposed sides thereof under fluid pressure supplied into the said cylinders.

Such further specified construction that uses a plurality of pistons to clamp the disk from its opposed sides provides an intensified clamping force arising from a greater force of friction that develops along an interface between these pistons and the disk.

The present invention also provides in a second aspect and a certain practical form of embodiment thereof, a method of machining a workpiece with a combined machining apparatus having a broaching tool adapted to carry rough machining tips and finish machining tips on an outer peripheral surface thereof, a broach drive means operable under numerical control to rotate the broaching tool and a broach holding means actuatable to hold a workpiece fixed against rotation and deactuatable to permit the broaching tool to be rotated, which method comprises the steps of:

positioning the said broaching tool at a machining site for a rotatable workpiece with at least one end thereof clamped;

rotating the said broaching tool with the said broach drive means operated under numerical control to index the said rough machining chips at a machining position therefor;

rotating the workpiece while actuating the said broach holding means thereby holding the said broaching tool fixed against rotation to carry out a rough machining operation with the said rough machining tips;

thereafter deactuating the said broach holding means to rotate the said broaching tool with the said broach drive means while rotating the workpiece to carry out a finish machining operation for the said workpiece with the said finish machining tips.

According to the method described, it follows that in a turning or lathing operation carried out with the rough machining tips, the broach holding means that effectively bears any large cutting torque that may develop in the rough cutting zone serves to effectively alleviate vibrations and a noise being generated therein; hence improvements both in the machining accuracy and the operating environments as well as an increase in the tool life advantageously ensues.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings hereof are intended in no way to limit the present invention but to facilitate an explanation and understanding thereof.

In the accompanying drawings

BEST MODES FOR CARRYING OUT THE INVENTION

Hereinafter, suitable embodiments of the present invention with respect to a combined machining apparatus and a machining of machining a workpiece by using the same are set out with reference to the accompanying drawings hereof.

Figure 1:
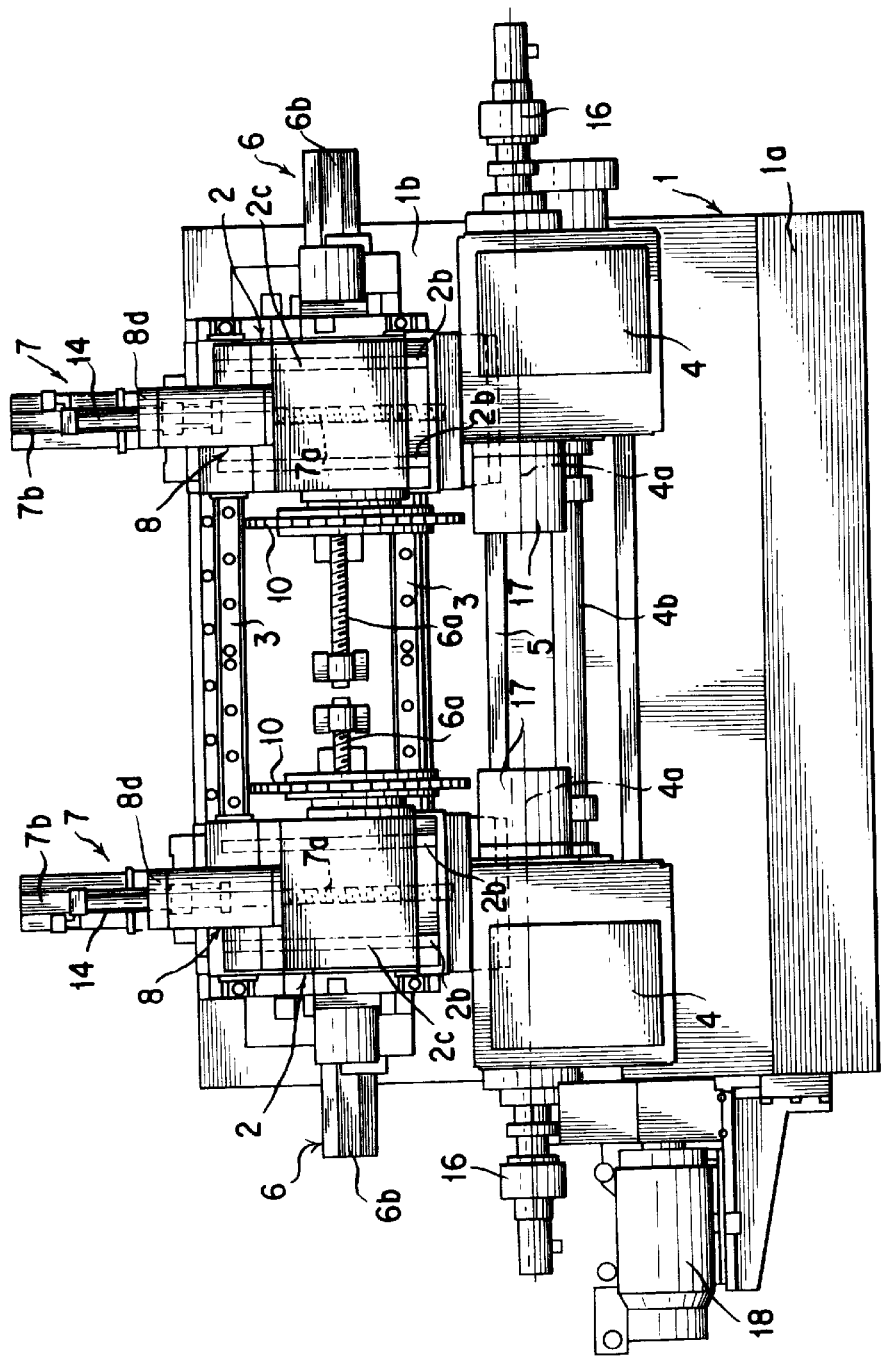
FIG. 1 is a front view that shows a combined machining apparatus embodied in a typical preferred form in accordance with the the present invention.
Figure 2:
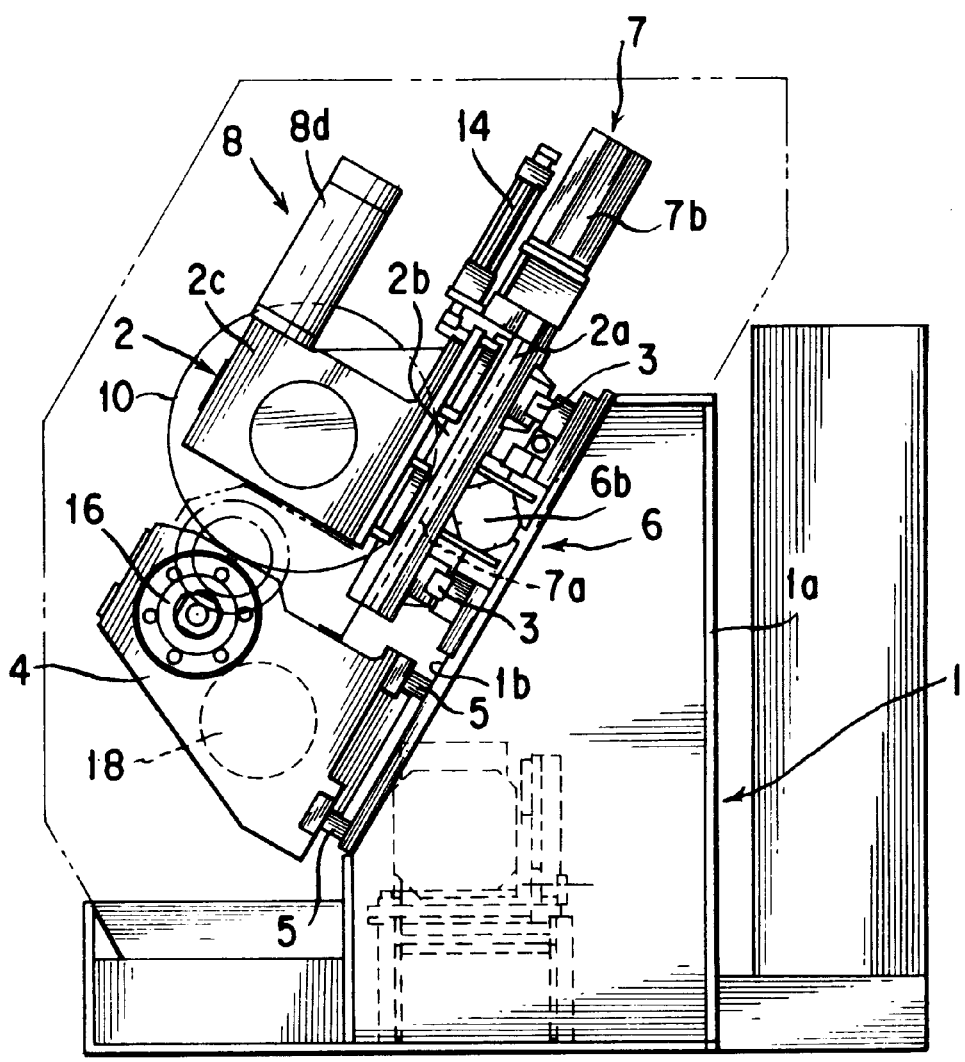
FIG. 2 is a side view of the combined machining apparatus shown in FIG. 1.
Figure 3:
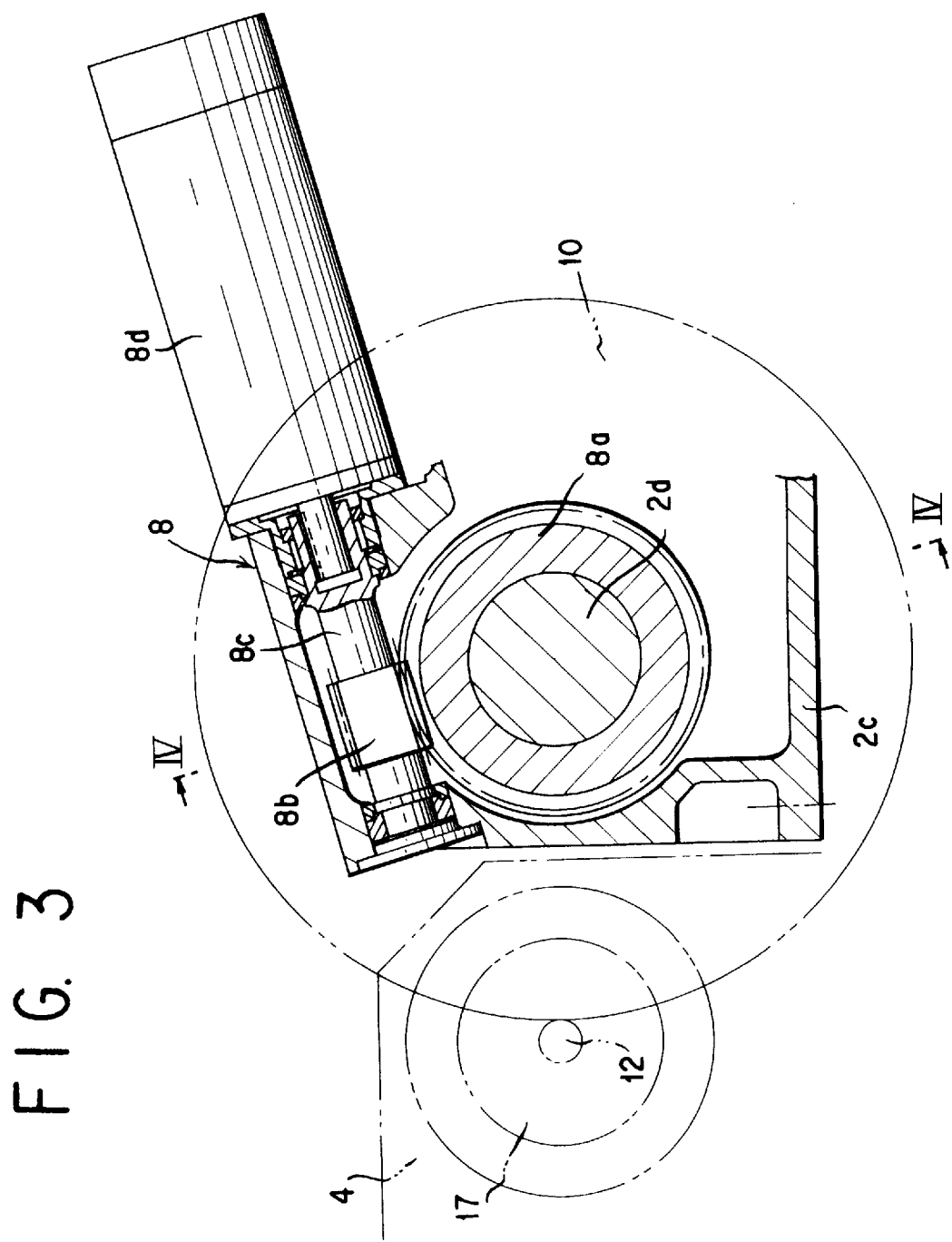
FIG. 3 is a cross sectional view that shows a typical broach drive means as used in the combined machining apparatus shown in FIGS. 1 and 2.
Figure 4:
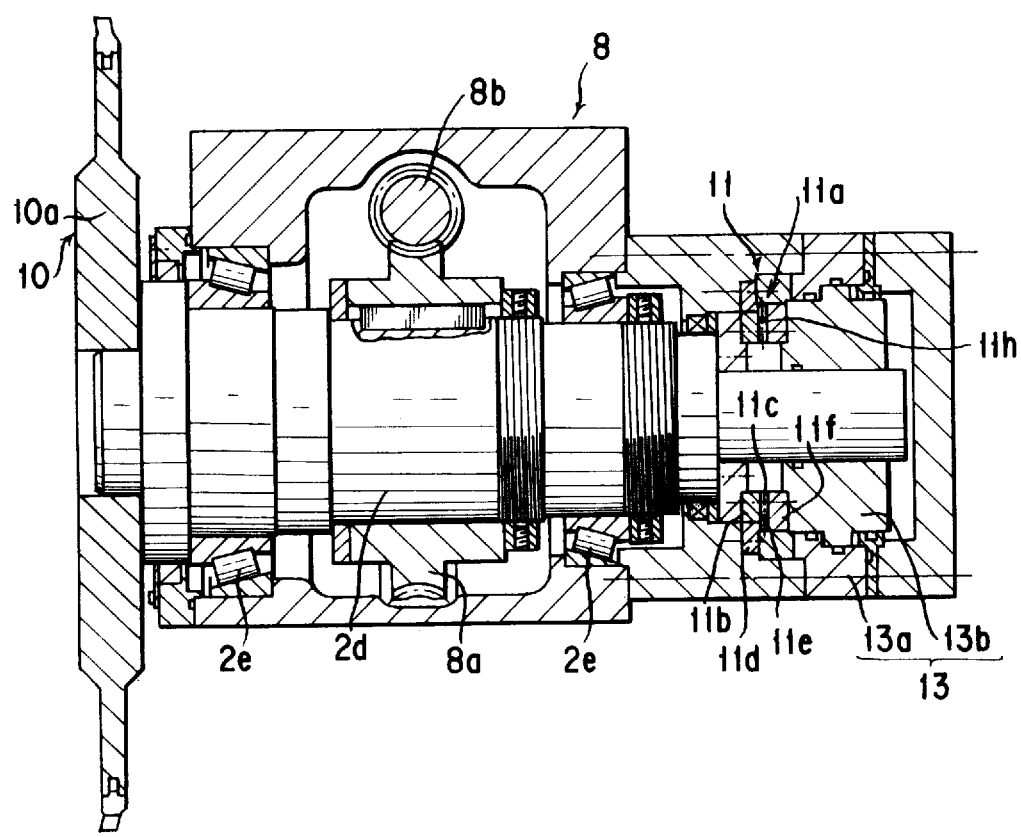
FIG. 4 is a cross sectional view of the broach drive means taken along the line IV—IV in FIG. 3.
Figure 5:
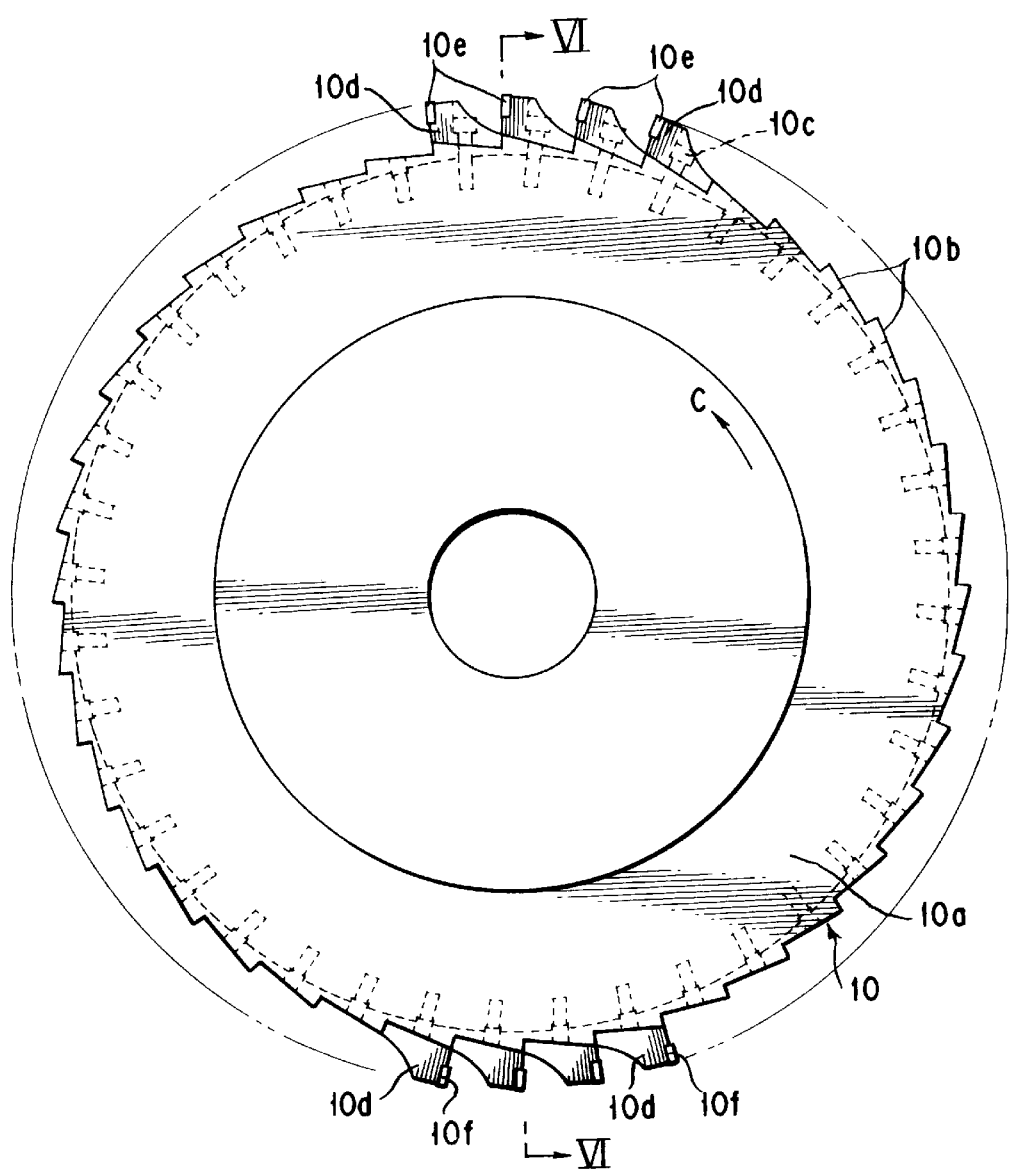
FIG. 5 is a side view that shows a typical broaching tool as used in the combined machining apparatus shown in FIGS. 1 and 2.
Figure 6:
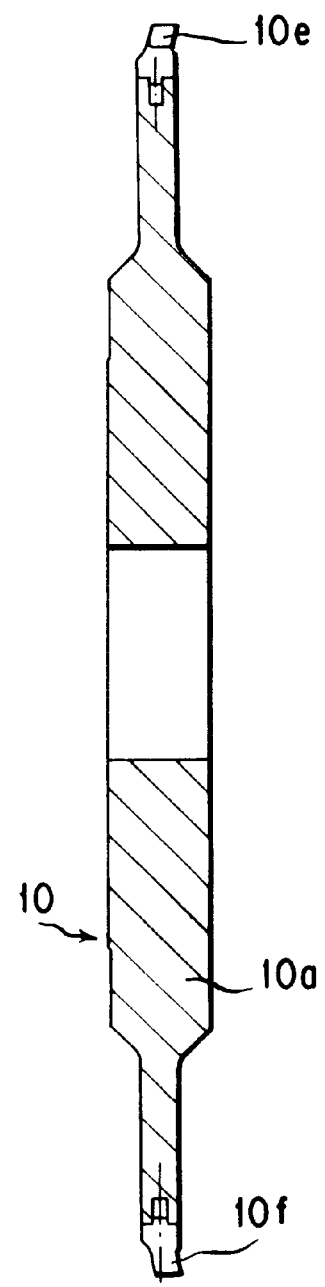
FIG. 6 is a cross sectional view of the broaching tool taken along the line VI—VI in FIG. 5.

A combined machining apparatus embodied in a certain preferred form in accordance with the present invention is shown, in its front view in FIG. 1 and in its side view in FIG. 2, with a broach drive means shown in cross section in FIGS. 3 and 4 and with a broaching tool shown in side view in FIG. 5 and in cross section in FIG. 6.

Referring first to FIGS. 1 and 2, the combined machining apparatus is designated at 1, having a bed 1a with an upper surface of inclination 1b that is sloped so as to be lowered towards the fore side of the apparatus 1. On the surface of inclination 1b there are laid, extending parallel to each other horizontally, a pair of first guide rails 3 at an upper side thereof and a pair of second guide rails 5 at a lower side thereof. The first guide rails 3 are designed to carry a broaching unit 2 so as to be movable in the directions of left and right hand sides. The second guide rails 5 are provided to carry a work head 4 so it may also be moved in the directions of left and right hand sides.

Here, two such broaching units 2 are shown as included in the apparatus 1, which are driven individually by respective unit feed means 6, disposed at a left hand and a right hand side, so as to be movable towards and away from each other.

Each of the unit feed means 6 comprises a threaded shaft 6a that may be a ball screw which is in mesh with a slide pedestal 2a provided at a lower part of the broaching unit 2 and a feed motor 6b that may be a servo motor which is connected to one end of the threaded shaft 6a. Thus, each unit feed means 6 is so configured to function that rotation of the threaded shaft 6a by the feed motor 6b may cause the slide pedestal 2a to be displaced along the guide rails 3.

On each of the slide pedestals 2a there are laid a pair of guide rails 2b extending in a direction orthogonal to the guide rails 3. A broach head 2c is supported on the guide rails 2b so as to be displaceable vertically, and is arranged to be moved vertically by a broach head feed means 7.

Each of the broach head feed means 7 includes a threaded shaft 7a which comprising a ball screw is arranged to extend between the pair of guide rails 2b parallel thereto. The threaded shaft 7a is in mesh with a lower part of the broach head 2c and has its upper end coupled to a feed motor 7b comprising a servo motor which is mounted on the upper end of the slide pedestal 2a as operable under an NC (numerical control). Thus, the respective broach heads 2c in the two broaching units 2 are arranged to be vertically displaced independently of each other when the corresponding threaded shafts 7a are caused to rotate in a normal or reverse direction by their respective feed motors 7b.

The left and right hand side broach heads 2c have their respective broach shafts 2d arranged to extend coaxially, one of which is shown in FIG. 3. As shown in FIG. 4, each broach shaft 2d is rotatably supported with a roller bearing 2e and arranged to be rotatable by a corresponding broach drive means 8.

Referring further to FIGS. 3 and 4, each of the broach drive means 8 comprises a worm wheel 8a keyed in the broach shaft 2d nearly its midway, a worm 8b in mesh with the worm wheel 8a with a small reduction ratio, and a broach drive motor 8d constituted by a servo motor that is coupled to the shaft 8c of the worm 8b as operable under NC.

The broach drive motor 8d, which is attached to the broach head 2c, is provided to rotate the broach shaft 2d via the worm wheel 8a and the worm 8b.

The coaxially extending broach shafts 2d and 2d (respectively included in the two broaching units 2 and 2) have broaching tools 10, shown in FIGS. 1 to 4, removably attached respectively to their one ends which are proximal and opposing to each other. The broach shafts 2d and 2d have their respective other ends, distal to each other, to which are attached respectively broach holding means 11 and 11 (see FIG. 4) that serve to hold their corresponding broach shafts 2d and 2d fixed in angular position when a rough machining operation for a workpiece is performed.

Referring to FIG. 5, the broaching tool 10 includes a tool body 10a that is formed in a serrated configuration on its outer periphery with a multiplicity of tip mounting seats 10b to which a like multiplicity of tip cartridges 10d may be removably secured by means of fasteners 10c. Each of the tip cartridges 10d has a function to individually accept a rough machining tip 10e or a medium/finish machining tip 10f fastened thereto, for machining a workpiece 12 shown in FIGS. 7A to 8B as referred to later. Thus, the cartridges 10d include cartridges 10d in a first group and cartridges 10d in a second group to accept the rough machining tips 10e and the medium or finish machining tips 10f, respectively, these cartridges 10d and 10d being attached to the outer peripheral surface of the tool body 10a as arranged thereon in order in a direction of rotation C of the tool body 10a.

On the other hand, as shown in FIG. 4 the broach holding means 11 for holding the broach shaft 2d fixed in position may, for example, comprise a tooth coupling assembly 11a of three toothed piece type and a fluid pressure cylinder assembly 13 designed to actuate and deactuate the tooth coupling assembly 11a.

More specifically, such a tooth coupling assembly 11a may comprise three pieces, constituted by: first a movable toothed element 11c with teeth that are formed on a rotary member 11b which is secured to the broach shaft 2d as rotatable therewith, second a fixed toothed element lie with teeth that are formed on a fixed member 11d which is secured to a cylinder member 13a of the fluid pressure cylinder assembly 13. The third element is a toothed stop element with teeth 11h which are formed on a fixed member 11f secured to a piston member 13b received in the cylinder 13a and which are engageable and disengageable with both of the teeth of the movable element 11C and the teeth of the fixed element 11e. Here, the tooth coupling assembly 11a is so operable that supplying a pressure fluid into the cylinder member 13a to move the piston member 13b towards the rotary member 11b may bring the toothed stop element 11h into engagement with both the movable toothed element 11c and the fixed toothed element 11e. This will permit the broach shaft 2d to become fixed precisely at a desired indexing angular position.

It should be noted that the broach holding means 11 needs not be limited to the use of such a toothed coupling assembly and may use any alternative that assures a fixation of the broach shaft with precision angle indexing. Such an alternative may make use of a disk 11g in conjunction with a hydraulic damper 20 as will be described later herein.

It should also be noted that in the arrangement shown in FIGS. 1 and 2, a balancing cylinder assembly 14, that may be constituted with a pneumatic cylinder, is provided to energize each of the broach heads 2c upwards. Such an assembly may also be used to support each of the broaching heads 10. Thus, using a balancing cylinder assembly to support the weights of a broach head 2c and a broaching tool 10 facilitates them to be vertically moved with a motor 7b of reduced capacity and size.

Referring also to FIGS. 1 and 2, the work heads 4 supported on the guide rails 5, lower in level, of the bed 1a are designed to be movable towards and away from each other by a work head feed means 16. Also, the work heads 4 have their respective main shafts 4a supported rotatably about a common axis.

Attached to each of the one ends of the main shafts 4a which are proximal and opposing to each other is a chuck 17 for clamping a workpiece (12) at its opposed ends. These main shafts 4a are coupled together with a synchronizing shaft 4b and designed to be synchronously rotated by a main shaft drive motor 18 mounted at one end side of the bed 1a.

Reference is now made to FIGS. 7A to 8B for describing specifically the machining of a workpiece such as a crankshaft blank by using the combined machining apparatus constructed as so far described.

In machining a crankshaft workpiece 12, an operating process is here adopted in which the machining of a flank of a counter weight portion 12a, the grooving a central region of a journal portion 12b and the rough machining of a Journal thrust portion 12c performed by plunge cutting, are effected by turning or lathing with the broaching tool 10 held fixed against rotation, and the finish machining of an outer periphery of the journal portion 12b as well as the finish machining of the journal thrust portion 12c and a corner area 12d is carried out by broaching or broach machining with the broaching tool 10 rotationally driven.

In initiating the machining operation, the workpiece 12 is introduced between the work heads 4 and is clamped at one or both ends of the workpiece 12 with one or both of the chucks 17. When the workpiece 12 is machined by using the two broaching units 2 simultaneously, the two broaching tools 10 are attached to the respective broach shafts 2d of these broaching units 2, respectively.

Next, the broaching units 2 are displaced by the feed motors 2 of the unit feed means 6, respectively, to index a portion or portions of the workpiece 12 to be machined with the broaching tools 10. Then, the broaching tools 10 are driven into rotation by the broach drive motors 8d of the broach drive means 8, first to index those cartridges 10d on each of the broaching tools which have the tips 10e for the rough machining of a flank of the counter weight portion 12a attached thereto at a proper machining position and then to fix the broach shafts 2d by the broach holding means 11 with the broaching tools 10 so positioned to index those tips 10e.

In fixing each of the broach shafts 2d, pressure fluid is supplied into the cylinder 13a of the fluid pressure cylinder assembly 13 to displace the piston 13b so as to bring the toothed stop element 11h thereon into mesh with both the movable toothed element 11c and the fixed toothed element 11e. During the machining operation, the pressure fluid is maintained in the fluid pressure cylinder 13 to prevent the fixation from being released.

Figure 7A:
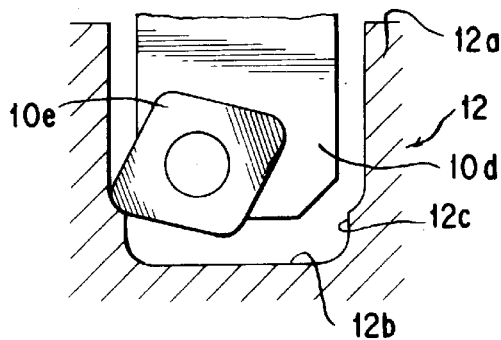
FIGS. 7A to 7C are diagrammatic views illustrating steps of a method of machining a workpiece by using the combined machining apparatus shown according to the present invention.

The indexing of the tips 10e for rough machining is followed by rotating the workpiece 12 with the main shaft drive motor 18. The broach heads 2c are then lowered with the feed motors 7b of the broach head feed means 7 to plunge cut one side flank of the counter weight portion 12a as shown in FIG. 7A. After it has been rough machined, next tips 10e are indexed and the other side flank is likewise machined.

Figure 7B:
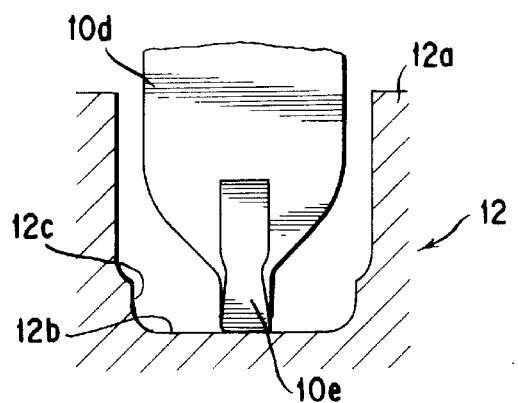
Figure 7C:
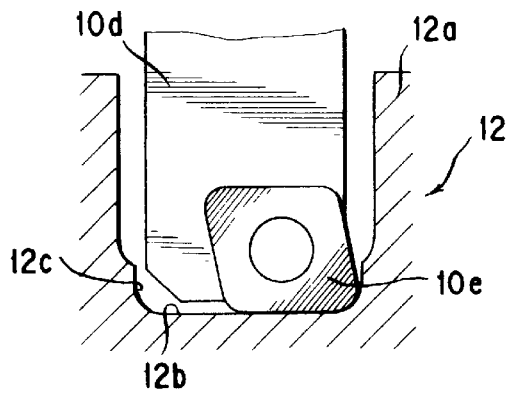

When the both side flanks of the counter weight portion 12a have been rough machined, those tips 10e which are designed to groove a central region of the journal portion 12b are indexed. After the central region of the journal portion 12b has been grooved as shown in FIG. 7B, those tips 10e which are designed to rough machine the journal thrust portion 12c are indexed. The journal thrust portion 12c is rough machined over the sides, one after the other, as shown in FIG. 7C.

If machining allowance is large, it should be noted that machining is carried out, divided into a plurality of steps to prevent an excessive cutting load from being applied onto the tips 10e.

After the turning operation for the workpiece 12 with the broaching tools 10 held against rotation, the process then proceeds to broaching with the broaching tools 10 used in rotation.

In broaching, the piston 13b in the fluid pressure cylinder assembly 13 is retracted to release the fixation of the broach shafts 2d with the broach holding means 11 and then to index those tips 10f which are designed to medium-finish machine, by broaching, an outer peripheral surface of the journal portion 12b.

Figure 8A:
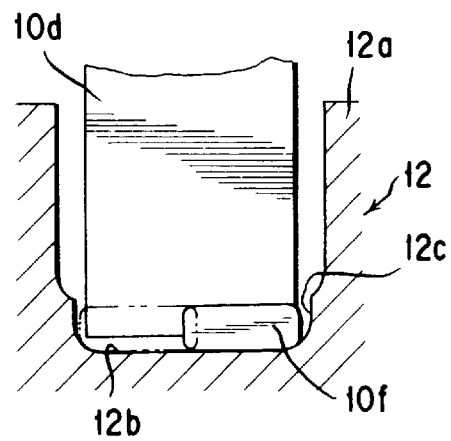
FIGS. 8A and 8B are diagrammatic views illustrating further steps of the workpiece machining method by using the apparatus shown according to the present invention.
Figure 8B:
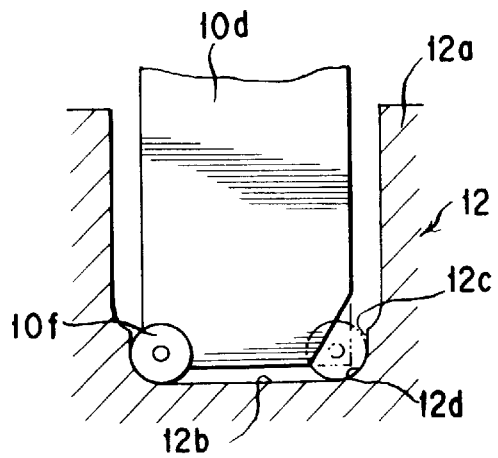

Then, with the workpiece 12 rotated, the broach heads 2c are lowered while the broach tools 10 are slowly rotated, to broach with those medium-finish machining tips 10f the outer peripheral surface of the journal portion 12b as shown in FIG. 8A and thereafter, by using next, finish machining tips 10f, to finish machine, in a plurality of steps, the outer peripheral of the journal portion 12b so medium-finish machined. Finally, the thrust journal portion 12c and the corner portion 12d are finish machined.

With no materially large cutting torque acting on the drive system for the broaching tools 10 in broaching, they can be sufficiently rotated even if it has a small reduction ratio.

In the indexing operation for the chips 10e for a turning purpose in which the fixation of the broach shafts 2d by the broach holding means 11 is released to allow, for indexing, the broach tools 10 to be rotated by the broach drive motors 8d, the use of a drive system of a small reduction ratio allows the time of indexing to be shortened, thus largely enhancing the operating efficiency to a large extent.

While a certain form of embodiment has been so far described for a method of machining a crankshaft workpiece, it can be seen and should be appreciated that the present invention is likewise applicable to machining other types of workpieces as well.

Also, while in the form of embodiment so far set forth, the broach holding means 11 is embodied using a tooth coupling assembly 11a, it can be seen and should be appreciated that the same can also be embodied in any other form of functional equivalent. For example, the broach holding means 11 can be in an alternative form as shown in FIGS. 9 and 10 and may comprise a disk 11g fastened to a said broach shaft 2d and a hydraulic damper 20 adapted to clamp and unclamp the disk 11g.

Figure 9:
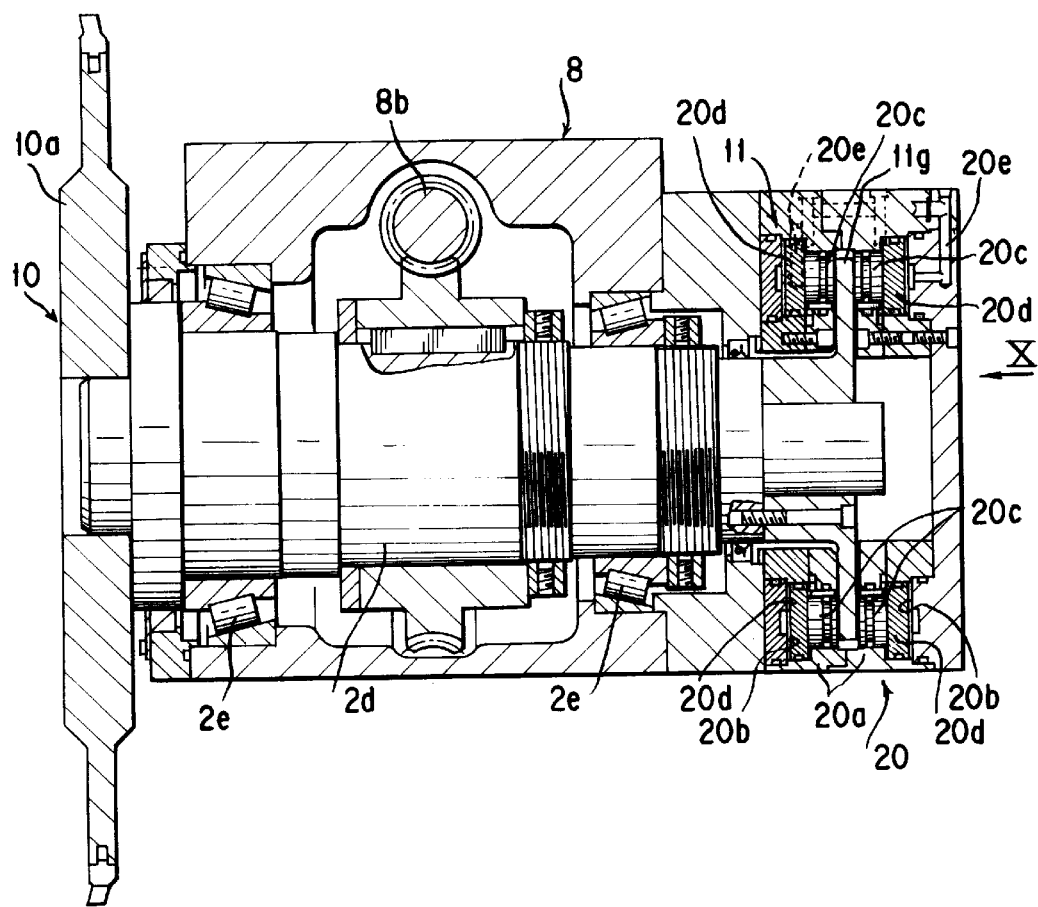
FIG. 9 is a cross sectional view that shows a broach drive means for use in a combined machining apparatus embodied in an alternative form in accordance with the present invention.
Figure 10:
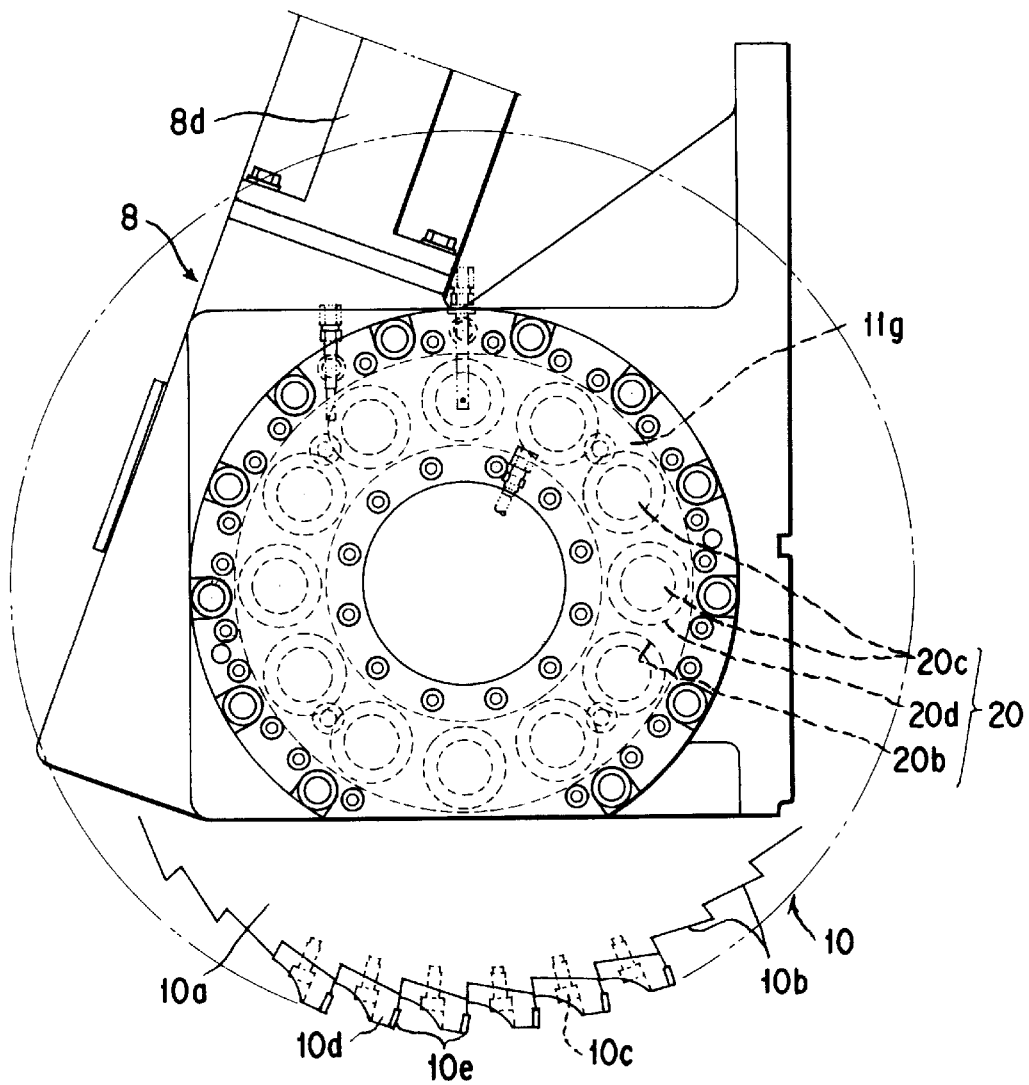
FIG. 10 is a side view partly in cross section of the broach drive means shown in FIG. 9 as viewed in the direction of the arrow.

Now, with reference to FIGS. 9 and 10 showing an the broach holding means 11 using a hydraulic damper 20, the disk 11g is fastened to each of the broach shafts 2d at one end thereof and a cylinder block 20a forming a part of the hydraulic damper 20 is arranged to enclose the disk 11g.

The cylinder block 20a is formed therein with a plurality of cylinders 20b as positioned opposite to one another across the disk 11g and spaced apart from one another circumferentially thereof. In each of the cylinders 20b a piston 20d is received having its piston rod 20c directed towards the disk 11g.

Each cylinder 20b has a fluid passage 20e connected thereto which is formed in the cylinder block 20a. The components described are so arranged that supplying pressure fluid into the cylinders 20b though the fluid passage 20e may cause the pistons 20d in the cylinders 20b to be moved towards the disk 11g and then the forward ends of the piston rods 20c of the pistons 20d opposite to one another to come into pressure contact with the disk 11g, thus clamping the latter across its opposed sides, thereby holding the broach shaft 2d firmly fixed against rotating.

It should be noted that the pressure of the pressure fluid supplied into the cylinders 20b can be adjusted to set the force of clamping the disk 11g at a desired magnitude.

An explanation will now be given of the operation of the broach holding means 11 constructed as described above. In this connection, it should be noted that the same method of machining as described earlier may apply and thus omitting to repeat its description here, an explanation will be limited to a method of holding or fixing each of the broaching tools 10.

First, assume that a workpiece 12 is machined using the rough machining tips 10e on the broaching tool 10. After the cartridges 10d with the rough machining tips 10e attached thereto are indexed at a machining position, the pressure fluid is supplied into the cylinders 20b in the hydraulic damper 20 to move the pistons 20d in the cylinders 20b towards the disk 11g and to hold the disk 11g from its both sides with the piston rods 20c projecting from the pistons 20d, hereby clamping the disk 11g.

A strong frictional force that develops between the disk 11g and the piston rod 20c at their contacting interface acts to intensively clamp the broach axis against rotation. Thus, if any excessive cutting load develops on the broaching tool 10 while the workpiece 12 is being rough machined, the broaching tool 10 held firmly fixed against rotation effectively prevents such excessive load from being transmitted to and applied on the side of the broach drive means 8 and permits a heavy cutting of the workpiece 12.

Also, this construction in which the disk 11g is clamped with the hydraulic damper 20, which is free from a teeth to teeth coupling arrangement as used in the previous embodiment 11g, permits the broaching tool 10 to be fixed and held fixed against rotation at any angle desired. Also, devoid of any action to bring toothed elements into and out of engagement with one another, the same construction allows the broaching tools 10 to be fastened and released quickly.

In initiating the subsequent broaching operation to be performed with the broaching tools 10 used in rotation to medium-finish machine and to finish machine the workpiece 12 which has been rough machined as described, the pressure fluid in the cylinders 20b of the hydraulic dampers 20 is reduced in pressure or discharged to unclamp the disk 11g with the hydraulic damper 20. Then, in the broaching process, with the workpiece 12 driven into rotation the broach drive means 8 are actuated to cause the unclamped broaching tools 10 to slowly rotate to broach the workpiece 12 successively with the medium-finis machining tips 10f and the finish machining tips 10f which are attached to the outer peripheral surfaces of the broaching tools 10.

No materially large cutting load developed to act on the broach drive means 8 permits the latter to be of a small reduction ratio enough to rotate or turn broaching tools 10.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A combined machining apparatus for lathing and broaching a workpiece, comprising:
    a work head for carrying a workpiece to be machined while in rotation, whereby the workpiece at least at one end thereof is clamped;
    at least one broaching unit disposed in the vicinity of said work head;
    a unit feed means for displacing said at last one broaching unit in a longitudinal direction of the workpiece;
    a broach head mounted on said broaching unit;
    a broach head feed means for displacing said broach head towards and away from the workpiece;
    a circular broaching tool mounted on said broach head and adapted to carry rough machining tips for lathe machining and finish machining tips for broach machining detachably on an outer peripheral surface of said circular broaching tool for both lathing and broaching the workpiece;
    a broach drive means operable under an NC for rotating said circular broaching tool; and
    a broach holding means received in said broach head and adapted to hold said circular broaching tool fixed against rotation when said workpiece is lathed therewith and to permit said circular broaching tool to be rotated with said broach drive means when said workpiece is broached therewith.

2. A combined machining apparatus as set forth in claim 1 in which said broach holding means comprises a tooth coupling of three piece type received in a broach shaft adapted to carry said broaching tool and a fluid pressure cylinder for actuating and deactuating said tooth coupling.

3. A combined machining apparatus as set forth in claim 1 in which said broach holding means comprises a disk fastened to a broach shaft adapted to carry said broaching tool and a hydraulic damper adapted to clamp and unclamp said disk.

4. A combined machining apparatus as set forth in claim 3 in which said hydraulic damper comprises a plurality of cylinders positioned opposite to one another across said disk and pistons received in the said cylinders and adapted to clamp said disk from opposed sides thereof under fluid pressure supplied into said cylinders.

* * * * *